April 28, 1970   A. KAHN ET AL   3,508,537
METHOD AND APPARATUS FOR AUTOMATIC BLOOD PRESSURE MONITORING
Filed April 20, 1965   5 Sheets-Sheet 5
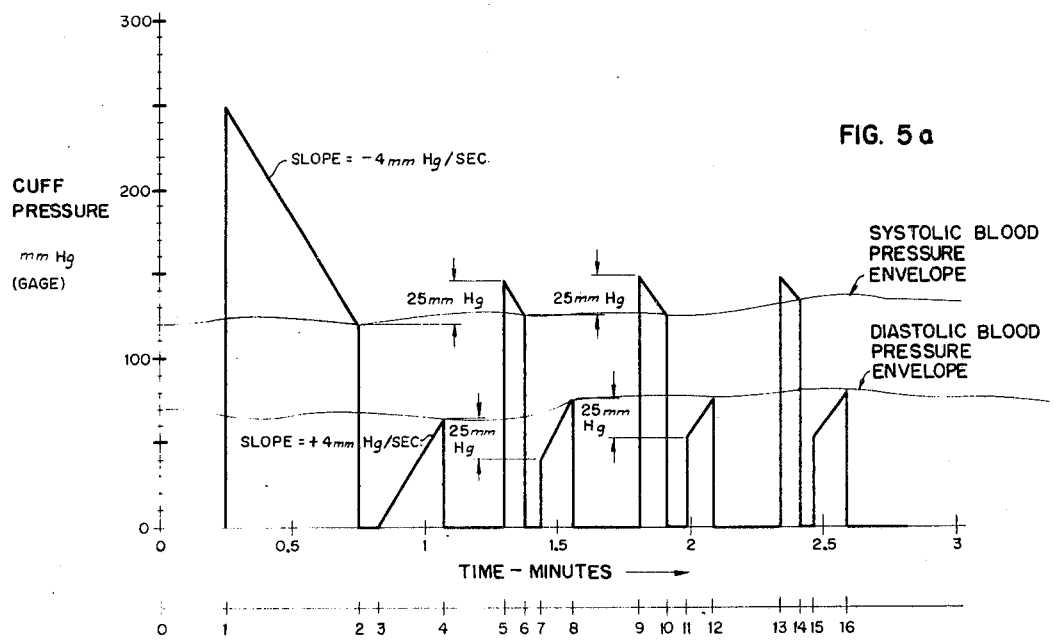
FIG. 5a
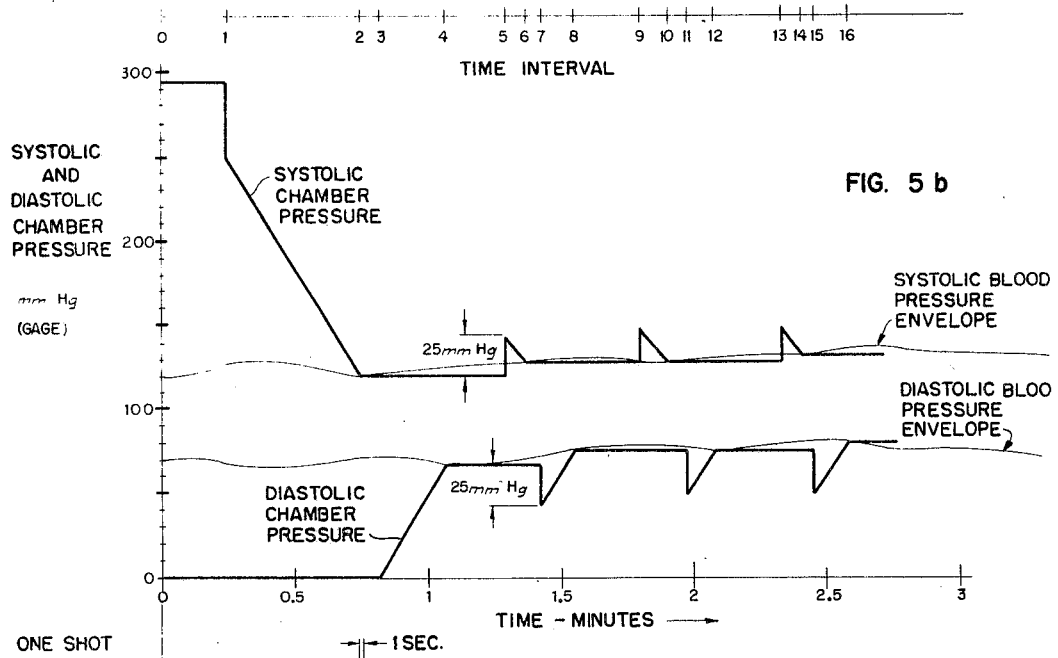
FIG. 5b
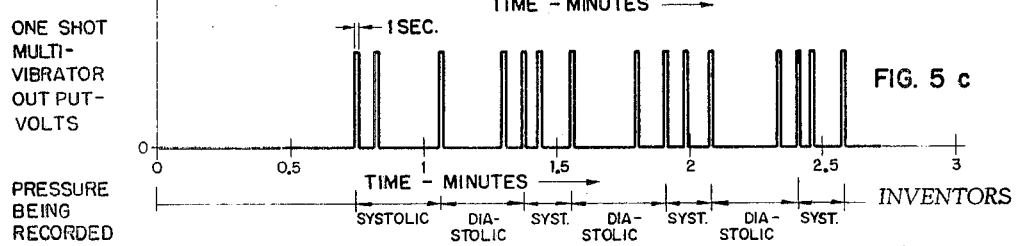
FIG. 5c
FIG. 5d
INVENTORS
ALAN KAHN
WARREN L. CHILDS
BY
ATTORNEY

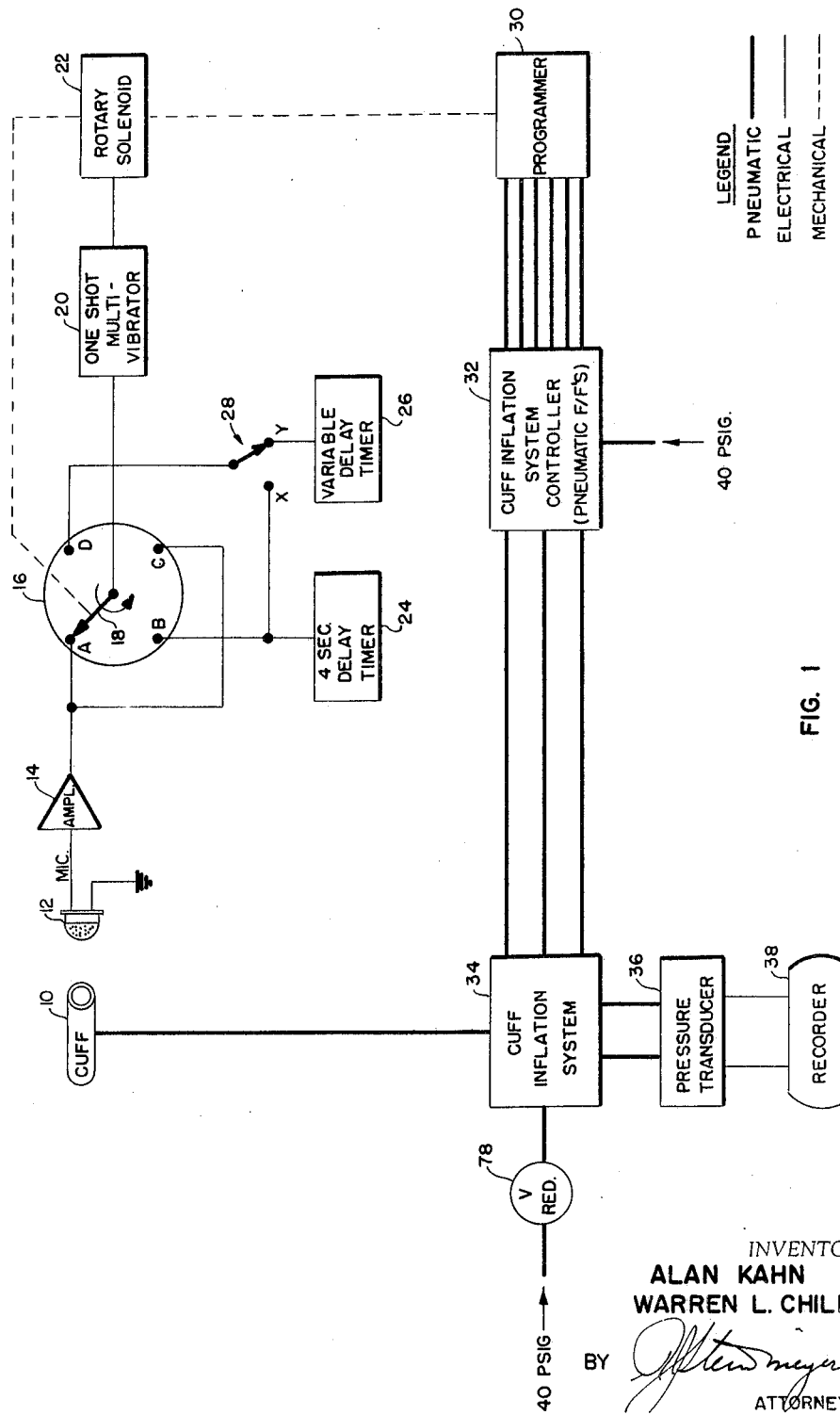

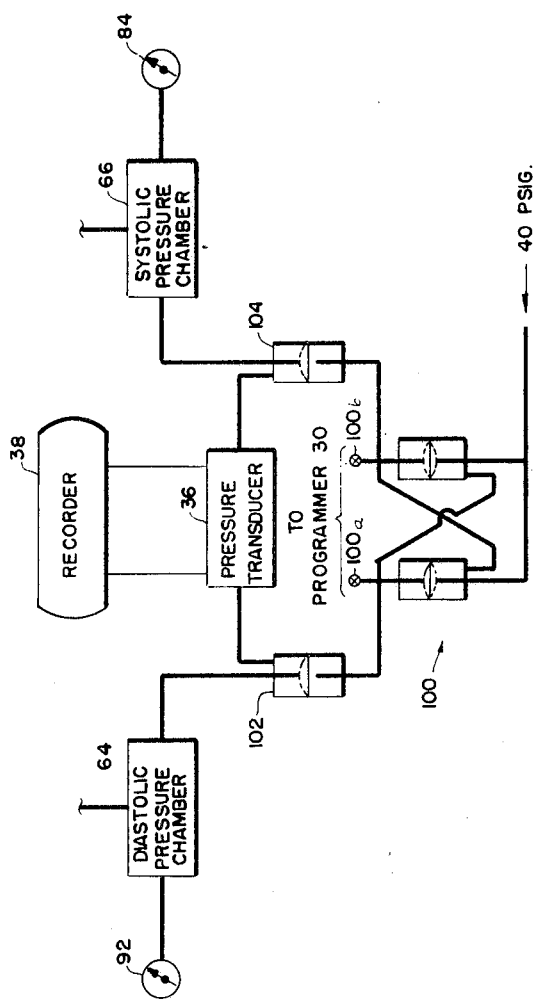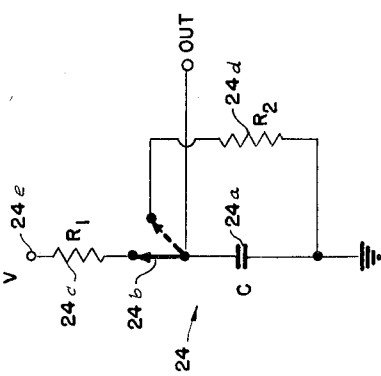

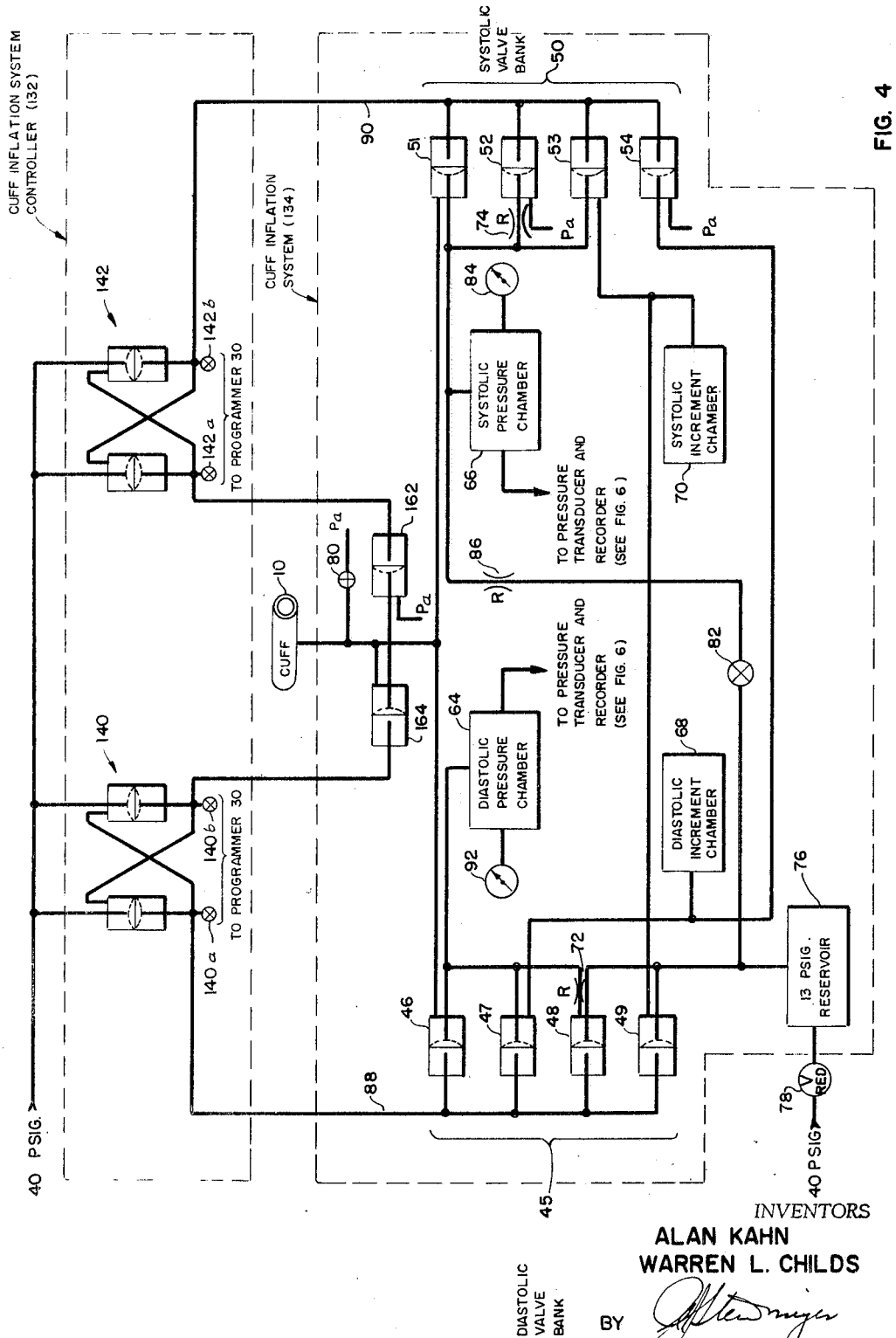

United States Patent Office

3,508,537
Patented Apr. 28, 1970

3,508,537
METHOD AND APPARATUS FOR AUTOMATIC BLOOD PRESSURE MONITORING
Alan Kahn, Fullerton, and Warren L. Childs, Ontario, Calif., assignors to Beckman Instruments, Inc., a corporation of California
Filed Apr. 20, 1965, Ser. No. 449,484
Int. Cl. A61b 5/02
U.S. Cl. 128—2.05                    21 Claims

ABSTRACT OF THE DISCLOSURE

A method and apparatus for automatically providing discrete measurements of systolic and diastolic blood pressures by rapidly inflating a cuff from a reference pressure to a pressure above the last-measured systolic pressure, slowly reducing the cuff pressure until systolic pressure is reached (as evidenced by Korotkov sounds), rapidly reducing the cuff pressure to reference pressure, delaying a given time period, rapidly inflating the cuff from the reference pressure to a pressure below the last measured diastolic pressure, slowly inflating the cuff until diastolic pressure is reached, rapidly reducing the cuff pressure to reference pressure, delaying a given time period, and repeating the above sequence.

---

This invention relates, in general, to pressure monitoring apparatus and in particular, to a pressure monitoring apparatus which may be used to automatically monitor the blood pressure of animal subjects, including humans.

Underlying the operation of the apparatus disclosed herein, is the well-known method devised by Riva-Rocci. This method utilizes an inflatable cuff adapted to surround a portion of the subject's upper arm. Sufficient inflation of the cuff closes or completely occludes the brachial artery. As the cuff is slowly deflated, a point is reached at which the artery begins to open for a short period during the cardiac cycle. At this point, the cuff pressure, which may be taken as being approximately equal to the blood pressure in the brachial artery, will be that of the peak pressure obtained during the cardiac cycle. This pressure is called the systolic pressure. Detection of the point at which the artery opens may be made by a suitable listening device such as a stethoscope or microphone applied to the arm over the artery downstream of the cuff. As the artery opens, sounds caused by the turbulence in the blood stream below the occlusion are picked up by the listening device. These sounds are called "Korotkov sounds." As the pressure in the cuff continues to drop, the sounds caused by the turbulence will continue in synchronization with the fluctuations in blood pressure during the cardiac cycle. Eventually a point is reached at which the artery remains open during the entire cycle. At this point, the turbulence in the blood stream, and the resulting sounds, cease. The cuff pressure at this point approximates the lowest blood pressure reached during the cardiac cycle. This blood pressure level is called the diastolic pressure. It may be seen that if values of the decreasing cuff pressure are recorded simultaneously with the output of the listening device, the cuff pressure at the time the first sound occurs is approximately equal to the systolic blood pressure and the cuff pressure at the time the last sound occurs is approximately equal to the diastolic blood pressure.

In blood pressure monitoring systems which perform the above-described method automatically, several considerations have been found to be of importance. For example, if the system is to be used on a subject who is moving his arm, means must be provided to prevent the cuff pressure from changing as a result of changes in cuff volume due to the arm movement. In addition, whenever the cuff is inflated, venous blood flow, that is, blood flow out of the arm, is retarded or stopped entirely. To prevent arm swelling, it is necessary to deflate the cuff for sufficient periods of time between readings. On the other hand, it is necessary to have a relatively slow rate of cuff inflation or deflation during the time that Korotkov sounds are being detected (about 4 mm. Hg/sec.) or else gross inaccuracies (greater than ±5%) result. The later consideration limits the frequency of blood pressure measurement.

Existing automatic blood pressure monitoring systems have certain disadvantages which the present invention seeks to overcome. First, these systems are not capable of blood pressure measurement while the subject is moving his arm because the cuff pressure cannot be regulated and/or because of a poor signal-to-noise ratio. Secondly, automatic systems which permit discrete, accurate measurements of systolic and diastolic blood pressure, are able to provide only a limited number of determinations over a relatively long period of time. Third, some of the existing systems require the cuff pressure to be applied over extended periods of time thus causing discomfort and possibly arm swelling.

Accordingly, it is the over-all object of the present invention to provide an improved method and apparatus for automatically monitoring two pressure levels such as the systolic and diastolic blood pressure of a subject.

It is another and more specific object of the present invention to provide an improved method and apparatus for automatically monitoring blood pressure, which method and apparatus are capable of furnishing a number of discrete measurements of systolic and diastolic blood pressure each minute while maintaining high accuracy.

It is yet another object of the present invention to provide an improved automatic blood pressure monitoring apparatus which is capable of accurate, high signal-to-noise ratio measurements of systolic and diastolic blood pressure even during movement of the subject's arm.

In accordance with one specific, exemplary embodiment of the present invention, there is provided a pneumatic cuff inflation system for inflating and deflating the cuff. The operation of the cuff inflation system is controlled by a programmer to furnish alternate measurements of systolic and diastolic blood pressure. The programmer is actuated, through various electrical and electromechanical means, by an output signal from a sound detecting device attached to the subject's arm under the cuff on the downstream side.

The cuff inflation system is provided with a pneumatic storage or memory means which retains the levels of systolic and diastolic pressure which were last measured. For the systolic measurement, the cuff is automatically inflated from approximately ambient atmospheric pressure to a pressure about 25 mm. Hg above the last-measured systolic pressure. Upon actuation of the appropriate valves, the cuff pressure deflates through a flow restrictor at a substantially uniform rate of 4 mm. Hg/second until the first Korotkov sounds are picked up by the detector. At this point, the cuff pressure is rapidly reduced or "dumped" to ambient atmospheric pressure. The systolic portion of the pneumatic memory holds the systolic pressure thus measured and this pressure may be recorded and/or visually indicated to the operator. Following a delay of about 4 seconds, the programmer next causes the cuff inflation system to inflate the cuff to a pressure level which is about 25 mm. Hg below the last-measured diastolic pressure. The cuff is then further inflated at the substantially uniform rate of 4 mm. Hg/second until the detector once again picks up the Korotkov sounds. Cuff pressure is quickly dumped to approximately ambient pressure while the diastolic pressure level is maintained in the pneumatic memory. Similar to the systolic pressure measurements, the diastolic pressure may be indicated on a pressure gauge and/or recorded. After a preset delay, which may range from several seconds to many minutes, the next set of systolic and diastolic blood pressure measurements may be made.

The unique advantages of the present system over the prior art may be readily seen. By quickly inflating the cuff to a pressure level relatively close to the last measurement, then slowly approaching the pressure to be measured and then rapidly deflating the cuff when the first Korotkov sounds are detected, the maximum number of readings per unit time are made possible commensurate with high accuracy, such as, at least ±5%. In addition, if the cuff is uninflated for a period of at least 4 seconds between successive readings, discomfort and arm swelling are prevented. Further, the pneumatic memory system serves the secondary purpose of providing a buffer volume which tends to prevent cuff pressure changes when the subject is moving his arm or engaging in some form of exercise.

The novel features which are believed to be characteristic of the invention are set forth with particularity in the appended claims. The invention itself, however, together with further objects and advantages thereof, can best be understood by reference to the following description of an exemplary embodiment thereof taken in connection with the accompanying drawings in which:

FIG. 1 is a schematic diagram of the over-all blood pressure measuring system of the present invention;

FIG. 2 is a circuit diagram of a delay timer which may be utilized in the present invention;

FIG. 4 is a schematic diagram of an alternative embodiment of the cuff inflation system and controller of FIG. 3;

FIGS. 5a, 5b, 5c and 5d are graphical time history representations of pressure and voltage at selected points in the blood pressure measuring system of the present invention; and, FIG. 6 is a schematic diagram of an automatic pressure sampling and recording system which may be utilized with the present invention.

Figure 3:
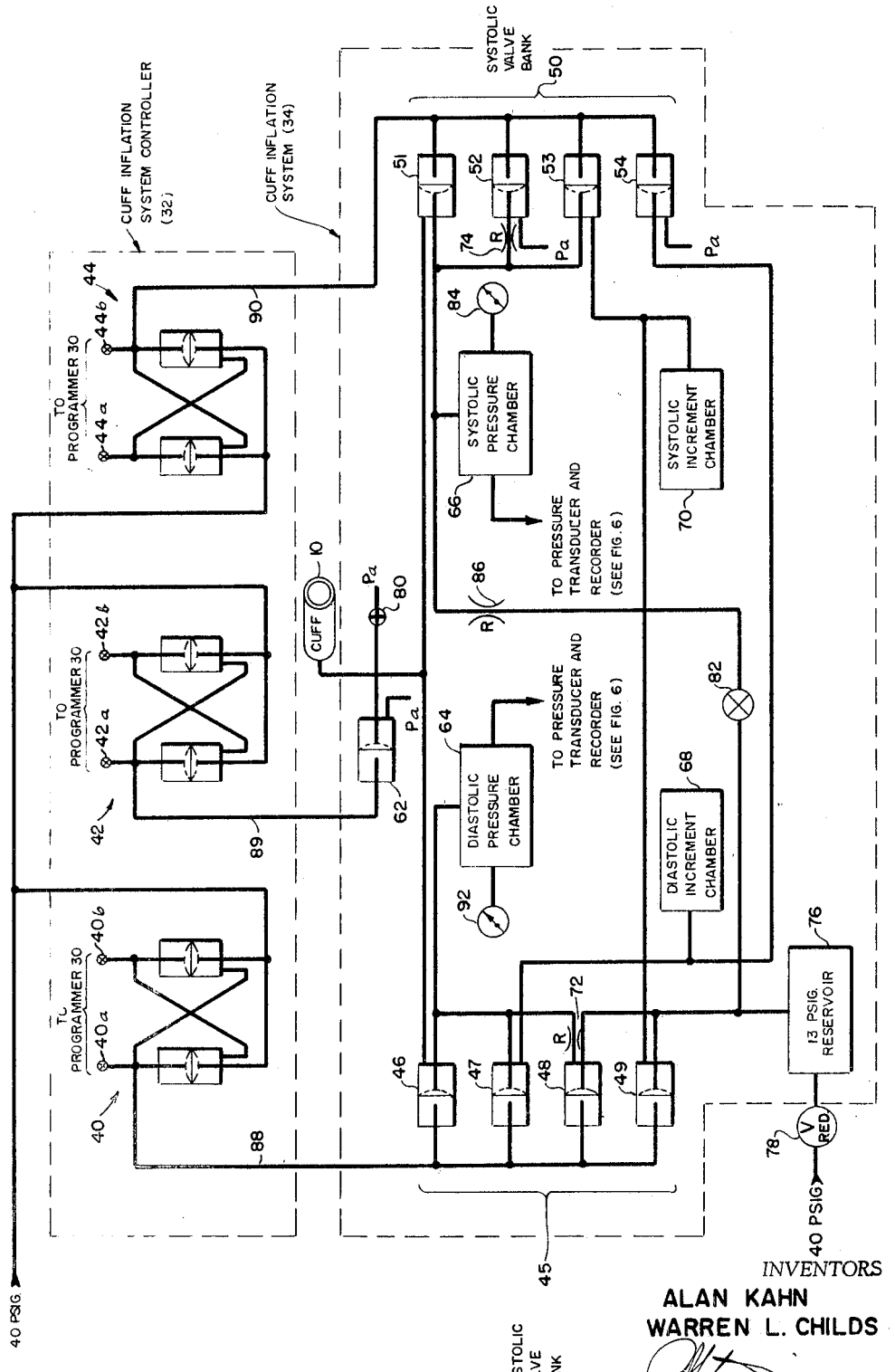
FIG. 3 is a schematic diagram of the cuff inflation system and the controller which actuates the cuff inflation system.

Referring now to FIG. 1, reference numeral 10 denotes an inflatable occluding cuff adapted to be secured about the upper portion of the arm of the subject. The cuff 10 should have sufficient width so that when pressurized it will be well coupled to the internal structures of the upper arm, thereby assuring that the cuff pressure will be substantially equal to the blood pressure in the artery.

A sound detector 12, which may take the form of a contact microphone, is attached to the subject's arm beneath the occluding cuff 10. A commercially available cardiac microphone having a resonant frequency below 100 c.p.s. has been found satisfactory for this purpose. Audio frequency signals detected by the microphone 12 are amplified by a narrow band-pass amplifier 14. In order to select the Korotkov sounds from other audio information picked up by the microphone, the resonant frequency of the amplifier 14 is about 30 c.p.s., and a suitable filter is employed.

An input selector in the form of a rotary step switch 16, having a wiper 18, intermittently connects the output of the amplifier 14 with the input of a triggering means in the form of a monostable or one-shot multivibrator 20, which may be of the type described in copending application Ser. No. 449,441 filed concurrently herewith, now U.S. Patent No. 3,374,365. The step switch 16 may be a multideck rotary switch capable of performing the functions to be described. However, for the sake of simplicity, and because the type of switch required will be obvious to one with ordinary skill in the art from a reading of the description which follows, the step switch 16 is depicted schematically as having only one deck.

The step switch 16 has 4 contacts (designated A, B, C and D), but it will be obvious as the description proceed that any number of steps integral with 4 can be used. The wiper 18 is rotated stepwise by a first mechanical output of an electromechanical drive means in the form of a rotary solenoid 22 which is energized by the one-shot multivibrator 20. In the position shown, which may be called a "listening" position, the wiper 18 connects the output of the amplifier 14 with the multivibrator 20 through the contact A. A signal from the amplifier 14, which occurs when the microphone 12 picks up the Korotkov sounds, triggers the multivibrator to its unstable ("on") state, in which it remains for a period determined by the time constant of the multivibrator circuit. A suitable period for the unstable state is about 1 second. A period of this length has the desirable effect of blocking out extraneous noise generated by the cuff action. The output signal from the multivibrator is sufficient to energize the rotary solenoid 22 thereby driving the wiper 18 to the next contact position B. In position B, a delay timer 24 is actuated which introduces a delay of 4 seconds, for example.

FIG. 2 is a schematic of the circuit of the delay timer 24. As shown in FIG. 2, timer 24 may be a simple RC circuit comprising a capacitor 24a connected in series, through a switch 24b, with a resistor 24c. The switch 24b may be formed by the contacts on one of the decks of the step switch 16. A shunt resistor 24d is connected across the capacitor 24a through the switch 24b. A D.C. voltage of appropriate amplitude is applied to the timer circuit at a terminal 24e and the output of the timer circuit (which corresponds to contact B of the step switch 16) is derived at the junction of the capacitor 24a and the resistor 24c. In the position of switch 24b shown by the dotted line, the capacitor 24a is discharged through the shunt resistor 24d. When the wiper 18 of step switch 16 is moved to contact B, switch 24b is simultaneously moved to the position shown by the solid line. The capacitor 24a, now connected to the voltage source through the resistor 24c, begins to charge. The values of the capacitor 24a and resistor 24c may be selected so that after the desired delay period, for example, 4 seconds, the D.C. level at the output (contact B) is sufficient to trigger the one-shot 20, which in turn actuates the rotary solenoid 22. Rotary solenoid 22 drives the wiper 18 to the next position (C) and simultaneously moves the switch 24b back to the position in which the capacitor 24a discharges through the resistor 24d.

Since contact C of the step switch 16 is connected to the output of the amplifier 14, this position, like position A, is a "listening" position. Thus, when Korotkov sound signals, detected by microphone 12 and amplified by amplifier 14, appear, the one-shot multivibrator 20 is triggered to the unstable state during which the multivibrator output energizes the rotary solenoid 22. As a result, the wiper 18 is moved to contact position D whereby connection is made between the input of the multivibrator 20 and either the delay timer 24 or a variable delay timer 25, dependent upon the position of a timer selector switch 28. The variable delay timer 26 typically may be a commercial unit, such as the Model GTD 15M manufactured by Industrial Timer Corporation. This timer permits the selection of a delay ranging from about 15 seconds to about 15 minutes.

As shown in FIG. 1, with the switch 28 in position Y, the variable delay timer 26 is in the circuit. At the expiration of the preset delay, the one-shot 20 is once again activated to the unstable state and the resulting energization of the rotary solenoid 22 causes movement of the wiper 18 back to position A.

As may be seen in FIG. 1, the rotary solenoid 22 has a second mechanical output which operates a programmer 30. The programmer 30 basically comprises a rotatable, multi-lobed cam (not illustrated) adapted to selectively open or close a set of switches or valves which operate a cuff inflation system controller 32. The controller 32, which consists primarily of a group of pneumatic switches of flip-flops, is used to control the operation of a cuff inflation system 34 which in turn pressurizes and de-pressurizes the cuff 10 as required for the systolic and diastolic blood pressure measurements. In effect, the rotary solenoid 22 coordinates the operation of the cuff inflation system 34 on the one hand with the detection of the Korotkov sounds by the microphone 12 and the action of the delay timers 24 and 26 on the other hand.

A pressure transducer 36 receives alternate systolic and diastolic pressure signals from the cuff inflation system 34. A recorder 38 connected to the output of the pressure transducer 36 may be used to plot time-history data of the two pressures.

Turning now to FIG. 3 of the drawings, there is shown a schematic of the cuff inflation system controller 32 along with the cuff inflation system 34. The controller 32 consists of three pneumatic bistable flip-flops 40, 42 and 44 of the type disclosed in copending application Ser. No. 322,879 (J. E. Rochte) filed Nov. 12, 1963, entitled "Bistable Pneumatic Logic Element and Valves" and assigned to Beckman Instruments, Inc., now U.S. Patent No. 3,322,148.

These pneumatic flip-flops, which are operated by a source of 40 p.s.i.g. pressure, have two stable states which, for the purposes of the present invention, may be referred to as the "on" and "off" states. The particular state of each flip-flop is determined by the positions of the two-way valves 40a, 40b, 42a, 42b, 44a and 44b which are controlled by the programmer 30. Using flip-flop 40 as an example, it will be seen that when valve 40a is open to the ambient atmosphere and valve 40b is closed, the output pressure of the flip-flop is substantially ambient. This condition comprises the "on" state. Conversely, in the "off" state, valve 40a is closed and valve 40b is open to the atmosphere and the output pressure is substantially that of the source—40 p.s.i.g. in this instance.

The cuff inflation system 34 has a first, or diastolic bank (reference numeral 45) of two-way valves 46—49 which are activated by the flip-flop 40 during the measurement of diastolic blood pressure and a second, or systolic bank (reference numeral 50) of two-way valves 51–54 which are activated by the flip-flop 44 during the measurement of systolic blood pressure. Each individual valve generally comprises two chambers separated by a flexible diaphragm responsive to differential pressure across it. Movement of the flexible diaphragm opens or closes the valve ports located on either side of the diaphragm.

The flip-flop 42 controls the operation of a cuff dump valve 62, which is also a two-way valve of the type described above. The cuff inflation system also includes a diastolic pressure chamber 64 and a systolic pressure chamber 66 which serve both as pneumatic memories for their corresponding pressures and as buffers to accommodate cuff volume changes due to arm motion.

In a manner to be described below, a diastolic pressure increment chamber 68 provides a 25 mm. Hg pressure increment below the last measured diastolic pressure and a systolic pressure increment chamber 70 provides a like increment above the last measured systolic pressure. Line restrictors 72 and 74 limit the flow rate to and from the chambers 64 and 66 respectively, to 4 mm. Hg/sec. A 13 p.s.i.g. reservoir 76 supplies the cuff inflation system. The same 40 p.s.i.g. source which powers the flip-flops, reduced by a reduction valve 78 to a level of 13 p.s.i.g., may be utilized to supply the reservoir 76. Excessive pressures in the cuff 10 are vented to the ambient atmosphere through a relief valve 80 which may be set at approximatley 6 p.s.i.g. (about 300 mm Hg).

With the aid of FIGS. 1 and 3 and the graphs of FIGS. 5a, 5b and 5c, the operation of the cuff inflation system 34 will now be explained. To simplify the explanation, the operation of the system may be broken down into distinct time periods or intervals which are indicated on the time interval scale just below FIG. 5a. At the beginning of the time interval 0–1, by opening a manual valve 82, the systolic chamber 66 is filled with air from the reservoir 76 to a pressure of about 295 mm. Hg, a level higher than the highest systolic blood pressure which may be expected. As the systolic pressure chamber 66 is being filled, the chamber pressure may be monitored by a pressure gauge 84 connected to the chamber. A restrictor 86 in the line from the reservoir to the systolic chamber 66 holds the flow rate to the chamber to a moderate level. Once a pressure of about 295 mm. Hg is noted in the systolic chamber 66, the manual valve 82 is closed. This valve requires no further manipulation since henceforth, the system operation is entirely automatic.

During the time interval 0–1, all the valves in both the diastolic bank 45 and the systolic bank 50 are closed. To accomplish this, flip-flops 40 and 44 are placed in the "off" state. As a result, a high pressure (approximately equal to the supply pressure of 40 p.s.i.g.) exists in the output lines 88 and 90, thereby flexing the pressure-responsive diaphragms in the valves to a position in which the pneumatic lines terminating in the right-hand valve chambers (as viewed in FIG. 2) in the case of the diastolic valve bank 45 and in the left-hand valve chambers in the case of the systolic valve bank 50, are covered. The positions of the valve diaphragms, when the valves are in the closed position are indicated by the dotted lines.

In addition, during the time interval 0–1, the cuff dump valve 62 is open, that is, a continuous flow path exists through the valve 62 from the cuff to the ambient atmosphere (designated $P_a$). To achieve this valve position, the flip-flop 42 is placed in the "on" state whereby the output pressure in the line 89 is approximately ambient. It may be seen that since the pressures on both sides of the diahragm of the valve 62 are substantially equal (both sides being at ambient pressure), the diaphragm will assume a neutral or unflexed position as indicated by the solid line.

At the end of the time interval 0–1, with the rotary step switch 16 in the "listening" position A and the programmer 30 set so that the valves in the systolic bank 50 are open and the cuff dump valve 62 is closed, the automatic operation of the system begins. The cuff 10 immediately inflates to about 250 mm. Hg gauge pressure through the valve 51. This is the equilibrium pressure of the cuff 10, which has an inflated volume of about 0.2 liter, the systolic chamber 66 with a volume of 4 liters and the systolic increment chamber 70 with a volume of 0.5 liter. At the same instant that the chambers 66 and 70 and the cuff 10 equilibrate at 250 mm. Hg gauge pressure, air begins to flow to the atmosphere ($P_a$) through the restrictor 74 and the open valve 52. The restrictor 74 permits a linear pressure drop of about 4 mm. Hg/second. This pressure drop may be seen graphically in FIGS. 5a and 5b as those portions of the cuff pressure and the systolic chamber pressure curves lying in the time interval 1–2. When the cuff pressure reaches the systolic blood pressure at the end of the interval 1–2, Korotkov sounds are picked up the microphone 12 thus energizing the rotary solenoid 22 through the one-shot multivibrator 20, the output wave form of which is depicted in FIG. 5c of the drawings. The rotary solenoid 22 simultaneously moves the rotary step switch 16 to position B and drives the programmer 30 to its next position. In this position, the programmer 30 causes the valves in the systolic bank 50 to close and the cuff dump valve 62 to open. As a result, the cuff pressure immediately drops to atmospheric. It is to be noted that with the systolic valve bank 50 closed, the systolic chamber 66 is now isolated from the rest of the system thereby retaining the measured systolic pressure. In this way, chamber 66 acts as a systolic pressure "memory" unit.

With the rotary step switch 16 in position B, a four second delay is introduced by the timer 24. This delay terminates with the triggering of the one-shot multivibrator 20 and energization of the rotary solenoid 22 at the end of time interval 2–3. The rotary switch 16 steps to the "listening" position C and the programmer 30 causes the valves in the diastolic valve bank 45 to open and the cuff dump valve 62 to close. The following events ensue: The cuff 10 begins to inflate through valve 48, the restrictor 72 and the valve 46; the diastolic pressure chamber 64 begins to fill simultaneously with and at the same rate as the cuff 10 through the valve 48 and the restrictor 72; similarly, the diastolic increment chamber 68 fills through the valve 48, the restrictor 72 and the valve 47; and the systolic increment chamber 70 immediately inflates to the reservoir pressure level of about 13 p.s.i.g. through the valve 49. The restrictor 72 limits the inflation rate of the cuff 10, the diastolic pressure chamber 64 and the diastolic increment chamber 68 to about 4 mm. Hg/sec. When the diastolic pressure is reached at the end of the time interval 3–4, the detected Korotkov sounds trigger the multivibrator 20 causing the rotary solenoid 22 to move to its next position. The step switch 16 is thereby rotated to the delay position D and the programmer 30 is stepped so that the valves in the diastolic bank 45 close and the cuff dump valve 62 opens. As a result of these operations, the cuff pressure dumps to ambient pressure, the diastolic pressure chamber 64, now isolated from the remainder of the system, retains or "remembers" the measured diastolic pressure, and the isolated systolic increment chamber 70 holds the reservoir pressure of about 13 p.s.i.g.

The length of the delay comprising time interval 4–5 is determined by the position of the selector switch 28. In position X of the switch 28, a four second delay takes place, but in position Y the operator can select a delay ranging from 15 seconds to 15 minutes, assumming a variable delay timer, such as the commercial unit described above, is used.

At the end of the delay interval 4–5, triggering of the multivibrator by either the timer 24 or the timer 26 moves the rotary solenoid 22 and thereby the step switch 16 and the programmer 30, to the next position. As a result, the cuff dump valve 62 closes and the systolic valve bank 50 opens thus interconnecting the cuff 10, which was at ambient pressure, the systolic chamber 66, which was holding the previously measured systolic pressure, and the systolic increment chamber 70, which was holding the 13 p.s.i.g. reservoir pressure level. Because of the volumetric differences between the cuff 10, the chamber 66 and the chamber 70, these units equilibrate at about 25 mm. Hg above the previously measured systolic pressure. This 25 mm. Hg pressure increment is provided by the systolic increment chamber 70. Also, with the valve 54 now open, the diastolic pressure chamber 68 immediately deflates to ambient pressure.

As in the time interval 1–2, the pressure in the cuff 10 and the systolic side of the system leaks at the linear rate of 4 mm. Hg/second through the restrictor 74 until the systolic pressure is reached, at which time the same sequence of events that occurred at the end of time interval 1–2 takes place. After the lapse of the 4-second delay interval 6–7, the diastolic side of the system is once again activated. This time, however, the diastolic chamber 64 is holding the previously measured diastolic pressure. With the opening of the valves in the diastolic valve bank 45, the cuff 10 and chambers 64 and 68 equilibrate at about 25 mm. Hg below the last measured diastolic pressure. This increment is provided by the diastolic increment chamber 68 which, prior to the actuation of the diastolic valves, was holding ambient pressure.

The above described sequence continues automatically for as long as blood pressure readings are desired. As may be best seen in FIG. 5a, cuff pressure is maintained for only short periods thus providing sufficient "rest" periods to permit venous blood flow, thereby preventing arm swelling and assuring the comfort of the subject. The preceding description shows that this is accomplished by quickly bringing the cuff pressure to a small incremental pressure above or below the last systolic or diastolic blood pressure respectively, and then slowly deflating or inflating the cuff until the end point, that is, the pressure to be measured, is reached. Upon reaching this pressure, the cuff is immediately deflated to ambient pressure.

A manual record of systolic and diastolic blood pressures may be made by reading the pressure gauges 84 and 92 connected to the systolic chamber 66 and the diastolic chamber 64, respectively. An automatic recording system, depicted in FIG. 6, will be described below.

Referring now to FIG. 4, there is shown an alternative embodiment of the cuff inflation system controller 32 and the cuff inflation system 34. The main structural difference between the embodiment of FIG. 3 and that of FIG. 4 is that in the latter only two flip-flops are used but an additional valve is necessary.

In the embodiment of FIG. 4, a pair of flip-flops 140 and 142, having valves 140a, 140b, 142a and 142b operated by the programmer 30, comprise a cuff inflation system controller 132. In this embodiment, both outputs of each flip-flop are utilized. In the case of the flip-flop 142, one output controls the operation of the systolic valve bank 50 and the other output controls the operation of a first cuff valve 162. Similarly, one output of the flip-flop 140 controls the valves in the diastolic valve bank 45 and the other output controls a second cuff valve 164. The valves 162 and 164 are connected in series so that, in order for the cuff pressure to dump to ambient pressure ($P_a$), both valves must be open.

The pressure outputs of the flip-flops 140 and 142 are always differential, that is, when one output is at a high level the other is at a low level and vice versa. Therefore, the states of the valves 162 and 164 will always be opposite to that of the systolic valve bank 50 and the diastolic valve bank 45, respectively. Thus, when valve 162 is open (with the diaphragm in the position shown by and vice versa. The same is true for valve 164 and the the solid line), the systolic valve bank 50 will be closed diastolic valve bank 45.

With the aid of FIG. 5a, the operation of the embodiment of FIG. 4 will now be described. During the time interval 0–1, both diastolic and systolic valve banks 45 and 50 are closed and therefore the cuff will be vented to atmospheric pressure. This is so because with both systolic and diastolic valve banks closed, the valves 162 and 164 will both be open. At the beginning of the time interval 1–2, the systolic valve bank 50 is open and the diastolic valve bank 45 is closed so that a systolic blood pressure measurement may be made. Valve 162 will remain open but valve 164 will close and as a result the cuff is sealed off from the atmosphere and may therefore be inflated for the systolic measurement. At the end of the interval 1–2, both valve banks 45 and 50 are closed. Therefore, valves 162 and 164 will both be open, thus allowing the cuff pressure to dump to ambient. For the diastolic measurement, the diastolic valve bank 45 is open at the beginning of the time interval 3–4 and valve 164 is therefore closed. Inflation of the cuff 10 for purposes of the diastolic measurement is thereby made possible.

FIG. 6 illustrates schematically an automatic pressure sampling and recording system which may be used in conjunction with the cuff inflation systems of FIGS. 3 and 4. This system alternately records values of the systolic and the diastolic blood pressures during the time intervals shown in FIG. 5d. A flip-flop 100, powered by the 40 p.s.i.g. air supply, operates two valves 102 and 104, which function to alternately connect the diastolic pressure chamber 64 and the systolic pressure chamber 66 to the pressure transducer 36. The electrical output of the pressure transducer 36 is connected to the recorder 38 which may take the form of an oscillograph, penwriter, or the like, so that a permanent record may be obtained.

The flip-flop 100 is programmed by the programmer 30 which operates the valves 100a and 100b so that a systolic pressure record is made during the time intervals 2-4, 6-8, etc., and a diastolic pressure record is made during the alternate intervals 4-6, 8-10, etc. (see FIG. 5d). Pressure records are therefore made during those intervals in which the chambers 64 and 66 are inactive, that is, holding the last measured diastolic or systolic pressure. During the time interval 2-4, a systolic pressure record is made by programming the flip-flop 100 so that valve 104 is open. The systolic chamber 66 is thereby connected to the pressure transducer 36. Since the pressure outputs of the flip-flops are differential, valve 102 will be closed. When a diastolic pressure record is being made, as for example during the time interval 4-6, the opposite situation exists—the valve 104 is closed and the valve 102 is open thus interconnecting the diastolic chamber 64 with the pressure transducer 36 while isolating the systolic pressure chamber 66.

It will be obvious to those skilled in the art that various modifications may be made to the specific exemplary embodiments of the invention described. While particular embodiments have been discussed, it will be understood that the invention is not limited thereto and that it is contemplated to cover any such modifications as fall within the true spirit and scope of the invention by the appended claims.

What is claimed is:

1. A method for automatically monitoring the systolic and diastolic blood pressures of a subject utilizing an inflatable circulatory system occluding means placed about an extremity of said subject, and a detecting means for detecting Korotkov sounds in said circulatory system, comprising the steps of
    inflating said occluding means rapidly from a reference pressure level to an incremental pressure above the last-measured systolic pressure;
    deflating said occluding means at a given rate until Korotkov sounds are detected by said sound detecting means;
    measuring, recording and storing said systolic pressure;
    deflating said occluding means rapidly to said reference pressure level;
    delaying a given time period;
    inflating said occluding means rapidly from said reference pressure level to an incremental pressure below the last-measured diastolic pressure;
    inflating said occluding means at a given rate until Korotkov sounds are detected by said sound detecting means;
    measuring, recording and storing said diastolic pressure;
    deflating said occluding means rapidly to said reference pressure level;
    delaying a given time period; and
    repeating the preceding steps.

2. The method defined in claim 1 in which said reference pressure level is substantially ambient atmospheric pressure.

3. Automatic apparatus for monitoring the systolic and diastolic blood pressures of a subject comprising
    means adapted to be placed about an extremity of said subject for occluding a portion of the circulatory system of said subject by the application of pressure;
    means for detecting Korotkov sounds in said circulatory system resulting from said occlusion;
    means for introducing a time delay between measurements of said systolic and diastolic blood pressures;
    means connected to said occluding means for inflating and deflating said occluding means and including pressure memory means for storing the last-measured systolic pressure and diastolic pressure;
    means connected to said inflating and deflating means for controlling said inflating and deflating means;
    means connected to said controlling means for programming said controlling means;
    means for alternately connecting said detecting means and said time delay means with said programming means, whereby said occluding means is inflated rapidly from ambient pressure to an incremental pressure above the last-named systolic pressure, deflated at a given rate until said Korotkov sounds in said circulatory system are detected by said sound detecting means, deflated rapidly to substantially ambient pressure, inflated rapidly following said time delay from ambient pressure to an incremental pressure below the last-measured diastolic pressure, inflated at a given rate until said Korotkov sounds in said circulatory systems are detected by said sound detecting means, deflated rapidly to ambient pressure, and, after said time delay, the foregoing cycle is continuously repeated; and
    means coupled to said inflating and deflating means for sensing measured values of systolic and diastolic pressures.

4. Automatic apparatus as defined in claim 3 in which said inflating and deflating means includes
    systolic pressure measuring means, selectively interconnectable with said occluding means, for rapidly increasing the pressure applied from substantially ambient pressure to a level which is a given increment above the last-measured systolic pressure;
    first pressure rate means connected to said systolic pressure measuring means for decreasing the applied pressure at a given rate until said systolic pressure is reached;
    diastolic pressure measuring means, selectively interconnectable with said occluding means, for rapidly increasing said applied pressure from substantially ambient pressure to a level which is a given increment below the last-measured diastolic pressure;
    second pressure rate means connected to said diastolic pressure measuring means for increasing said applied pressure at a given rate until said diastolic pressure is reached; and
    means connected to said pressure applying means for selectively and rapidly reducing said applied pressure to substantially ambient pressure upon reaching the blood pressure to be measured.

5. Automatic apparatus as defined in claim 4 in which said means for alternately connecting said detecting means and said time delay means with said programming means includes
    an input selector having a first input connected to said sound detecting means and a second input connected to said time delay means and an output;
    a triggering means responsive to signals from said input selector output and having an output; and
    a position selection means, actuated by a signal from said triggering means output, and having a first output connected to control the position of said input selector and a second output connected to control the position of said programming means.

6. Automatic apparatus as defined in claim 5 in which said time delay following said systolic measurement is different than said time delay following said diastolic measurement.

7. Automatic apparatus as defined in claim 6 which includes
    means connected to said pressure sensing means for automatically recording measured values of systolic and diastolic pressures.

8. Automatic apparatus for monitoring the systolic and diastolic blood pressures of an animal subject by the detection of Korotkov sounds, comprising
    an inflatable cuff adapted to be placed about an extremity of said subject for periodically applying pressure and thereby occluding a portion of the circulatory system of said subject;

means for inflating and deflating said cuff whereby said cuff may be successively and continuously inflated from substantially ambient pressure to a predetermined incremental pressure above the last-measured systolic pressure, deflated at a given rate until said Korotkov sounds are detected, deflated rapidly to substantially ambient pressure, inflated rapidly to a predetermined incremental pressure below the last-measured diastolic pressure, inflated at a given rate until said Korotkov sounds are detected, and rapidly deflated to ambient pressure;

means connected to said cuff inflating and deflating means for controlling said cuff inflating and deflating means;

means connected to said controlling means for programming said controlling means;

a pressure source connected to said inflating and deflating means and to said controlling means;

a detector, adapted to be attached to said extremity of said subject, responsive to said Korotkov sounds and having an eletrical output signal which corresponds to said sounds;

an amplifier having an input connected to said detector output for amplifying said electrical output signals, and an output;

a step switch having at least one input connected to said amplifier output and at least one other input, and an output;

a delay timer having an output connected to said other step switch input;

a triggering means having an input connected to said step switch output, and an output;

a drive means energized by said triggering means output and having an output for driving said programming means and said step switch whereby said amplifier output and said delay timer output are alternately and successively connected to said triggering means; and an automatic recording means connected to said cuff inflation means for recording measured values of systolic and diastolic pressures.

9. Automatic apparatus as defined in claim 8 in which said cuff inflating and deflating means includes
a pressure reservoir connected to said pressure source;
a systolic pressure chamber;
a systolic increment chamber;
a systolic flow restrictor having an inlet and an outlet;
a diastolic pressure chamber;
a diastolic increment chamber;
a diastolic flow restrictor having an inlet and an outlet;
systolic valve means for selectively interconnecting said systolic pressure chamber, said systolic increment chamber and said cuff with said systolic flow restrictor inlet, and said systolic flow restrictor outlet and said diastolic increment chamber with the ambient atmosphere;
diastolic valve means for selectively interconnecting said diastolic pressure chamber, said diastolic increment chamber and said cuff with said diastolic flow restrictor outlet, and said reservoir and said systolic increment chamber with said flow restrictor inlet; and
cuff valve means for selectively interconnecting said cuff with the ambient atmosphere.

10. Automatic apparatus as defined in claim 9 in which said controlling means includes
a first bistable switching element having an output connected to operate said systolic valve means;
a second bistable switching element having an output connected to operate said diastolic valve means; and
a third bistable switching element having an output connected to operate said cuff valve means.

11. Automatic apparatus as defined in claim 9 in which said cuff valve means includes a first cuff valve serially connected to a second cuff valve and which includes
a first bistable switching element having a first output connected to operate said systolic valve means and a second output connected to operate said first cuff valve; and
a second bistable switching element having a first output connected to operate said diastolic valve means and a second output connected to operate said second cuff valve.

12. Automatic apparatus as defined in claim 9 in which said automatic recording means includes
a pressure transducer;
a recorder connected to said pressure transducer;
a first two-way valve adapted to interconnect said systolic pressure chamber with said pressure transducer;
a second two-way valve adapted to interconnect said diastolic pressure chamber with said pressure transducer; and
a pneumatic, bistable element having a first output connected to operate said first two-way valve and a second output connected to operate said second two-way valve so that said pressure transducer is alternately connected to said systolic pressure chamber and to said diastolic pressure chamber whereby said recorder alternately records values of systolic and diastolic pressure.

13. In an automatic systolic and diastolic blood pressure monitoring apparatus, utilizing an inflatable occluding cuff adapted to be placed about an extremity of a subject, means for inflating and deflating said cuff and means for controlling said inflating and deflating means, comprising
a reservoir, connected to a pressurized air source, for holding a supply of air under substantially constant pressure;
a systolic pressure chamber;
a systolic increment chamber;
a systolic flow restrictor having an inlet and an outlet;
a diastolic pressure chamber;
a diastolic increment chamber;
a diastolic flow restrictor having an inlet and outlet;
a systolic valve bank comprising first, second, third and fourth two-way valves, said first valve adapted to interconnect said cuff with said systolic pressure chamber and said systolic flow restrictor inlet, said second valve adapted to interconnect said systolic flow restrictor outlet with the ambient atmosphere, said third valve adapted to interconnect said systolic pressure chamber with said systolic increment chamber and said fourth valve adapted to interconnect said diastolic increment chamber with the ambient atmosphere;
a diastolic valve bank comprising first, second, third and fourth two-way valves, said first valve adapted to interconnect said cuff with said diastolic pressure chamber and said diastolic flow restrictor outlet, said second valve adapted to interconnect said diastolic increment chamber with said diastolic pressure chamber, said third valve adapted to interconnect said reservoir with said diastolic flow restrictor inlet and said fourth valve adapted to interconnect said reservoir with said systolic increment chamber;
a manual system valve;
a manual system flow restrictor, said manual system valve and flow restrictor connected in series between said reservoir and said systolic pressure chamber;
a cuff dump valve means adapted to interconnect said cuff with the ambient atmosphere; and
pneumatic control means, connected to said systolic valve bank, said diastolic valve bank and said cuff dump valve means, for controlling said valve banks and said cuff dump valve means.

14. A cuff inflating and deflating means and controlling means as defined in claim 13 in which said cuff dump valve means comprises a two-way valve and said pneumatic control means includes
    a first pneumatic bistable element having an output connected to operate said first, second, third and fourth valves in said systolic valve bank;
    a second pneumatic bistable element having an output connected to operate said first, second, third and fourth valves in said diastolic valve bank; and
    a third pneumatic bistable element having an output connected to operate said cuff dump valve.

15. A cuff inflating and deflating means and controlling means as defined in claim 13 in which said cuff dump valve means comprises two serially connected two-way valves and said pneumatic control means includes
    a first pneumatic bistable element having a first output connected to operate said first, second, third and fourth valves in said diastolic valve bank and a sec- output connected to operate one of said serially connected cuff dump valves; and
    a second pneumatic bistable element having a first output connected to operate said first, second, third and fourth valves in said diastolic valve bank and a second output connected to operate the other of said serially connected cuff dump valves.

16. In an automatic pressure monitoring apparatus which includes a first pressure memory means for storing a first measured pressure and a second pressure memory means for storing a second measured pressure, a pressure sampler comprising
    a pressure transducer;
    a first valve operable to connect said first pressure memory means with said pressure transducer;
    a second valve operable to connect said second pressure memory means with said pressure transducer;
    a pneumatic control element for controlling the operation of said first and second valves, said control element having first and second stable states and a first output connected to said first valve and a second output connected to said second valve, whereby in said first state of said control element, said first valve is operated to connect said first pressure memory means with said pressure transducer and in said second state of said control element said second valve is operated to connect said second memory means with said pressure transducer; and
    recording means connected to said pressure transducer.

17. A method for automatically monitoring the systolic blood pressure of a subject utilizing an inflatable circulatory system occluding means placed about an extremity of said subject, and a detecting means for detecting Korotkov sounds in said circulatory system, comprising the steps of
    inflating said occluding means rapidly from a reference pressure level to a pressure above the last-measured systolic pressure;
    deflating said occluding means at a given rate until Korotkov sounds are detected by said sound detecting means;
    measuring, recording and storing said systolic pressure;
    deflating said occluding means rapidly to said reference pressure level;
    delaying a given time period; and
    repeating the preceding steps.

18. A method for automatically monitoring the diastolic blood pressure of a subject utilizing an inflatable circulatory system occluding means placed about an extremity of said subject, and a detecting means for detecting Korotkov sounds in said circulatory system, comprising the steps of
    inflating said occluding means rapidly from said reference pressure level to a pressure below the last-measured diastolic pressure;
    inflating said occluding means at a given rate until Korotkov sounds are detected by said sound detecting means;
    measuring, recording and storing said diastolic pressure;
    deflating said occluding means rapidly to said reference pressure level;
    delaying a given time period; and
    repeating the preceding steps.

19. Automatic apparatus for monitoring the systolic and diastolic blood pressures of a subject comprising
    means adapted to be placed about an extremity of said subject for occluding a portion of the circulatory system of said subject by the application of pressure;
    means for detecting Korotkov sounds in said circulatory system resulting from said occlusion;
    means for introducing a time delay between measurements of said systolic and diastolic blood pressures;
    means connected to said occluding means for inflating and deflating said occluding means and including pressure memory means for storing the last-measured systolic pressure and diastolic pressure;
    means connected to said inflating and deflating means for controlling said inflating and deflating means;
    means connected to said controlling means for programming said controlling means;
    means for alternately connecting said detecting means and said time delay means with said programming means, whereby said occluding means is inflated rapidly from a reference pressure to a pressure above the last-measured systolic pressure, deflated at a given rate until said Korotkov sounds in said circulatory system are detected by said sound detecting means, deflated rapidly to substantially said reference pressure, inflated rapidly following said time delay from reference pressure to a pressure below the last-measured diastolic pressure, inflated at a given rate until said Korotkov sounds in said circulatory systems are detected by said sound detecting means, deflated rapidly to reference pressure, and, after said time delay, the foregoing cycle is continuously repeated; and
    means coupled to said inflating and deflating means for sensing measured values of systolic and diastolic pressures.

20. Automatic apparatus for monitoring the systolic blood pressure of a subject comprising
    means adapted to be placed about an extremity of said subject for occluding a portion of the circulatory system of said subject by the application of pressure;
    means for detecting Korotkov sounds in said circulatory system resulting from said occlusion;
    means for introducing a time delay between measurements of said systolic blood pressure;
    means connected to said occluding means for inflating and deflating said occluding means and including pressure memory means for storing the last-measured systolic pressure;
    means connected to said inflating and deflating means for controlling said inflating and deflating means;
    means connected to said controlling means for programming said controlling means;
    means for alternately connecting said detecting means and said time delay means with said programming means, whereby said occluding means is inflated rapidly from a reference pressure to a pressure above the last-measured systolic pressure, deflated at a given rate until said Korotkov sounds in said circulatory system are detected by said sound detecting means, deflated rapidly to substantially said reference pressure, and after said time delay, the foregoing cycle is continuously repeated; and
    means coupled to said inflating and deflating means for sensing measured values of systolic pressure.

21. Automatic apparatus for monitoring the diastolic blood pressure of a subject comprising
    means adapted to be placed about an extremity of said subject for occluding a portion of the circulatory system of said subject by the application of pressure;
means for detecting Korotkov sounds in said circulatory system resulting from said occlusion;
means for introducing a time delay between measurements of said systolic and diastolic blood pressures;
means connected to said occluding means for inflating and deflating said occluding means and including pressure memory means for storing the last-measured diastolic pressure;
means connected to said inflating and deflating means for controlling said inflating and deflating means;
means connected to said controlling means for programming said controlling means;
means for alternately connecting said decting means and said time delay means with said programming means, whereby said occluding means is inflated rapidly from a reference pressure to a pressure below the last-measured diastolic pressure, inflated at a given rate until said Korotkov sounds in said circulatory systems are detected by said sound detecting means, deflated rapidly to substantially said reference pressure, and, after said time delay, the foregoing cycle is continuously repeated; and
means coupled to said inflating and deflating means for sensing measured values of diastolic pressure.

References Cited

UNITED STATES PATENTS

| | | | |
|---|---|---|---|
| 3,085,567 | 4/1963 | Vigilante | 128—2.05 |
| 3,104,661 | 9/1963 | Halpern | 128—2.05 |
| 3,137,292 | 6/1964 | Richter et al. | 128—2.05 |
| 3,202,148 | 8/1965 | London | 128—2.05 |
| 3,236,230 | 2/1966 | Follett | 128—2.05 |
| 3,280,817 | 10/1966 | Jorgensen et al. | 128—2.05 |

WILLIAM E. KAMM, Primary Examiner